United States Patent [19]
Yap

[11] Patent Number: 6,073,193
[45] Date of Patent: Jun. 6, 2000

[54] FAIL SAFE METHOD AND APPARATUS FOR A USB DEVICE

[75] Inventor: Kok-Kean Yap, Milpitas, Calif.

[73] Assignee: Cypress Semiconductor Corp., San Jose, Calif.

[21] Appl. No.: 08/839,981

[22] Filed: Apr. 24, 1997

[51] Int. Cl.[7] .................................................. G06F 13/00
[52] U.S. Cl. .............................. 710/100; 710/131; 714/1; 714/3
[58] Field of Search ..................................... 395/280, 180, 395/181, 182.01, 182.03, 828, 830; 710/100, 8, 10, 131; 714/1, 2, 3, 5

[56] References Cited

U.S. PATENT DOCUMENTS

| | | | |
|---|---|---|---|
| 3,800,090 | 3/1974 | Matena | 379/33 |
| 3,810,120 | 5/1974 | Huettner et al. | 340/172.5 |
| 3,864,670 | 2/1975 | Inoue et al. | 340/172.5 |
| 4,195,351 | 3/1980 | Barner et al. | 340/825.05 |
| 4,481,625 | 11/1984 | Roberts et al. | 370/85 |
| 4,775,976 | 10/1988 | Yokoyama | 371/9 |
| 5,282,166 | 1/1994 | Ozaki | 365/203 |
| 5,404,480 | 4/1995 | Suzuki | 711/117 |
| 5,471,524 | 11/1995 | Colvin et al. | 379/200 |
| 5,566,296 | 10/1996 | Ohmori et al. | 395/180 |
| 5,675,813 | 10/1997 | Holmdahl . | |

FOREIGN PATENT DOCUMENTS

WO 97/36230  10/1997  WIPO .

*Primary Examiner*—Ayaz R. Sheikh
*Assistant Examiner*—Ario Etienne
*Attorney, Agent, or Firm*—Christopher P. Maiorana, P.C.

[57] ABSTRACT

A method and apparatus for determining and recovering from a USB micro-controller busy condition, wherein a toggle variable indicative of whether the USB micro-controller is in the busy condition or not is stored in a memory, and a counter is incremented if the toggle variable is set. The counter is checked to determine if the counter has reached a predetermined count, and if so data lines of the USB micro-controller are disconnected from a USB bus coupled to the USB micro-controller for a predetermined amount of time to cause a USB host computer coupled to the USB micro-controller to re-initialize the USB micro-controller. The memory contains a data structure including fields for storing the toggle variable, and a count indicative of how many times the toggle variable has been set for implementing the counter. Firmware in the memory includes code segments configured to store the toggle variable in the data structure, determine if the toggle variable is set, increment the count field if the toggle variable is set, determine if the counter has reached the predetermined count, and disconnect the data lines of the processor from the USB bus for a predetermined amount of time if the counter has reached the predetermined count.

20 Claims, 7 Drawing Sheets

FAIL SAFE METHOD AND APPARATUS FOR A USB DEVICE

CROSS REFERENCES TO RELATED APPLICATIONS

This application may be related to U.S. patent application Ser. No. 08/705,807 filed Aug. 30, 1996, entitled "DUAL ROM MICROPROGRAMMABLE MICROPROCESSOR AND UNIVERSAL SERIAL BUS MICROCONTROLLER DEVELOPMENT SYSTEM" Now U.S. Pat. No. 5,859,993, and U.S. patent application Ser. No. 08/711,419 filed Aug. 30, 1996, entitled "MICROCONTROLLER DEVELOPMENT SYSTEM AND APPLICATIONS THEREOF FOR DEVELOPMENT OF A UNIVERSAL SERIAL BUS MICROCONTROLLER", both of which are incorporated herein by reference.

BACKGROUND OF THE INVENTION

1. Field of the Invention

This invention relates to a fail safe method and apparatus for a Universal Serial Bus ("USB") device, and more particularly to a method and apparatus for allowing a USB device to recover from a malfunction condition.

2. Discussion of Background

USB is a peripheral bus standard that allows computer peripherals to be attached to a personal computer without the need for specialized cards or other vendor specific hardware attachments. The USB standard specifies a common configuration for the connection of well known peripherals, such as CD-ROM, tape and floppy disk drives, scanners, printers, keyboards, joysticks, mice, telephones, modems, etc. to a USB host computer. In addition to well known peripheral devices, the USB standard has flexibility to accommodate less known and newly developed devices, such as plug-and-play devices which are automatically configured by the host computer when these devices are added. Information about the USB standard, including the USB specification v1.0, incorporated herein by reference, for building USB compliant devices, is currently available free of charge over the Internet.

However, a malfunction condition may occur in a USB device, such as a plug-and-play device, wherein the USB device after being configured by the host computer may malfunction and stop communicating with the host computer due to problems, such as transmission errors, USB protocol errors, bugs in the host operating system or device firmware, etc. For example, a host operating system may terminate the function of the USB device, which may be busy at the moment or fails to acknowledge incoming data packets more than three times, for not communicating with the host computer. The above situation is referred to as a "brown out" condition.

According to the USB specification v1.0, page 201, the host operating system is supposed to record the last error type without trying to re-establish communications with the non-communicating USB device. When this occurs, (1) the user may have to re-boot the USB device or physically disconnect and then re-connect the USB device to allow the host computer to recognize and then re-configure the USB device, or (2) the host computer operating system must be smart enough to avoid terminating the USB device when the USB device is terminally busy not communicating (e.g., continuously returning non-acknowledge (NAK) signals) and reset and re-configure the USB device. The first method defeats the whole purpose of plug-and-play technology, and the second method requires additional USB host computer operating system overhead to keep track of and recover from the USB device brown out condition.

SUMMARY OF THE INVENTION

Accordingly, one object of the present invention is to provide a method and apparatus for recovering from a USB device brown out condition which requires no user intervention.

Another object of the present invention is to provide a method and apparatus for recovering from a USB device brown out condition which is independent from a USB host computer operating system.

It is another object of the present invention to provide a method and apparatus wherein no additional USB host computer operating system overhead is required to keep track of and recover from a USB device brown out condition.

It is also an object of the present invention to provide a method and apparatus for recovering from a USB device brown out condition without a need to re-boot the USB device or physically disconnect and then re-connect the USB device.

It is a further object of the present invention to provide a method and apparatus for recovering from a USB device brown out condition which requires minimum additional hardware and firmware overhead.

The above and other objects are achieved according to the present invention by a providing a method for determining and recovering from a processor busy condition, including incrementing a counter if a variable indicative of the processor busy condition is set, determining if the counter has reached a predetermined count, and disconnecting at least one of a plurality of data lines of the processor from a bus coupled to the data lines for a predetermined amount of time if the counter has reached the predetermined count.

According to a second aspect of the present invention, there is provided a device for determining and recovering from a processor busy condition, including a means for storing a variable indicative of whether or not the processor is in the busy condition; a means for incrementing a counter if the variable indicative of the processor busy condition is set; a means for determining if the counter has reached a predetermined count; and a means for disconnecting at least one of a plurality of data lines of the processor from a bus coupled to the data lines for a predetermined amount of time if the counter has reached the predetermined count.

According to a third aspect of the present invention, there is provided an apparatus for determining and recovering from a processor busy condition, including a memory coupled to the processor configured to store a variable indicative of whether or not the processor is in the busy condition; a counter; and one or more devices configured to: (a) increment the counter if the variable indicative of the processor busy condition is set, (b) determine if the counter has reached a predetermined count, and (c) disconnect at least one of a plurality of data lines of the processor from a bus coupled to the data lines for a predetermined amount of time if the counter has reached the predetermined count.

According to a fourth aspect of the present invention, there is provided a computer program product, including a computer storage medium and a computer program code mechanism embedded in the computer storage medium for causing a computer to determine and recover from a processor busy condition. The computer program code mechanism includes a first computer code segment configured to store a variable indicative of whether or not the processor is in the busy condition; a second computer code segment configured to determine if the variable indicative of the processor busy condition is set; a third computer code segment configured to increment a counter if the variable indicative of the processor busy condition is set; a fourth computer code segment configured to determine if the counter has reached a predetermined count; and a fifth computer code segment configured to disconnect at least one of a plurality of data lines of the processor from a bus coupled to the data lines for a predetermined amount of time if the counter has reached the predetermined count.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 1:
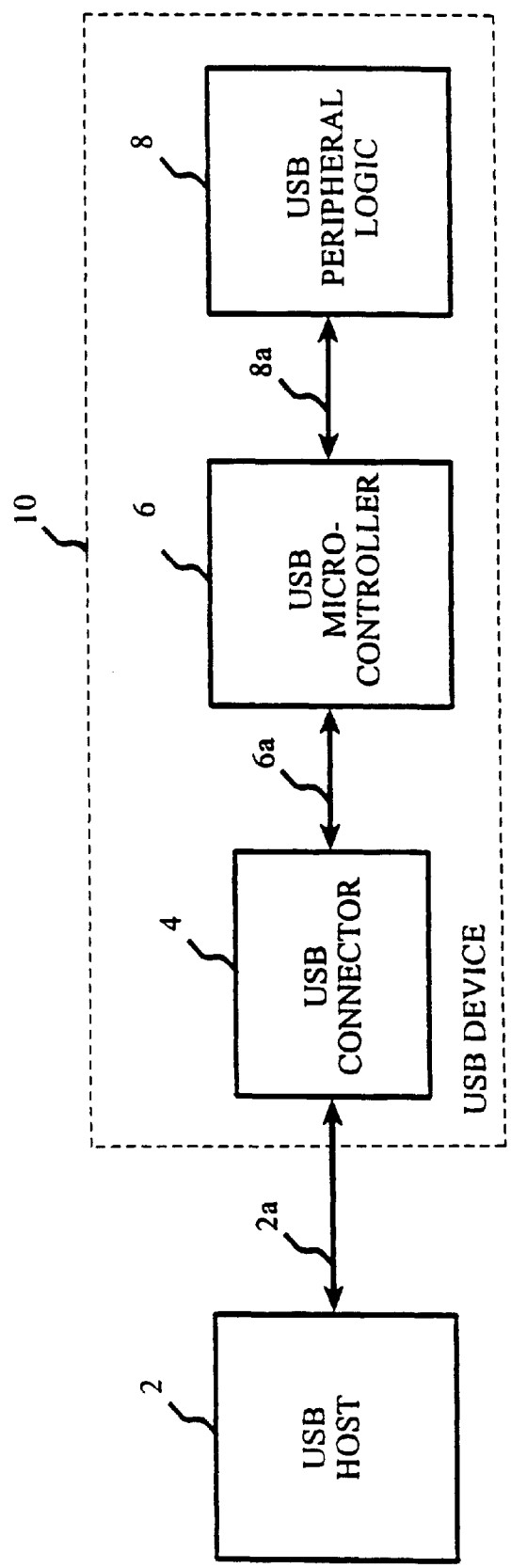
FIG. 1 is a block diagram illustrating a USB system configuration.

Referring now to the drawings, wherein like reference numerals designate identical or corresponding parts throughout the several views, and more particularly to FIG. 1 thereof, there is illustrated a USB system including a USB host computer 2, and a USB device 10, according to the present invention.

In FIG. 1, the USB device 10 includes a USB connector 4 and a USB micro-controller 6, such as a Cypress Semiconductor CY7C6300, etc. The USB device 10 is coupled via signal lines 8a to USB peripheral logic 8, such as logic for a plug-and-play CD-ROM, tape or floppy disk drive, scanner, printer, keyboard, joystick, mouse, telephone, modem, etc. The USB host computer 2 is coupled to the USB device 10 via signal lines 2a and the USB micro-controller 6 communicates with the USB host computer 2 via signal lines 2a and the USB connector 4.

Figure 2:
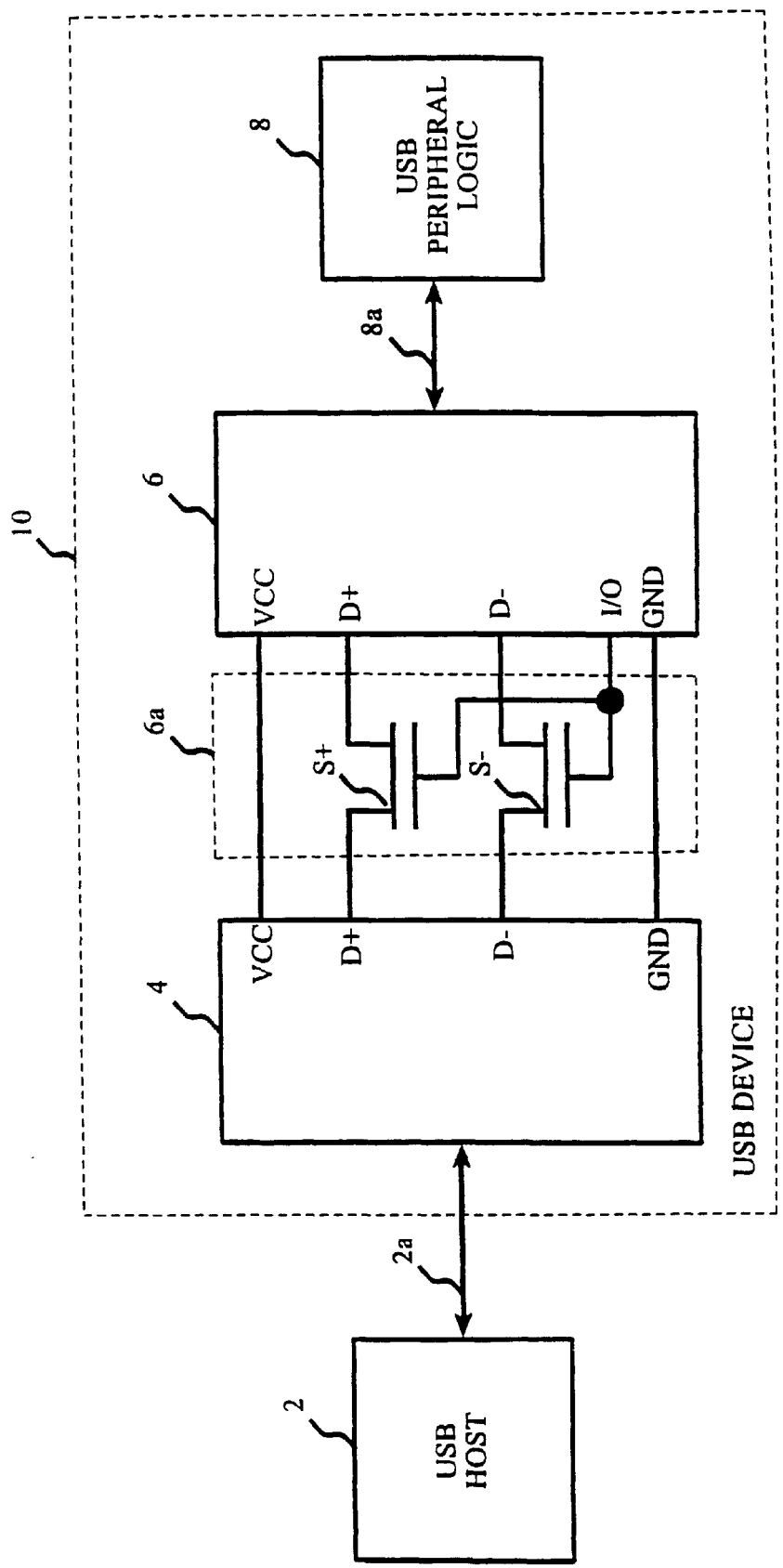
FIG. 2. is a block diagram illustrating a USB fail safe configuration in the system configuration of FIG. 1, according to a first embodiment of the present invention.

In FIG. 2, a first embodiment of the USB device 10 of FIG. 1 further includes switching devices S+ and S−, such as transistors, contact switches, etc., coupled to positive data (D+) and negative data (D−) lines of the signal lines 6a. Please note that only one pair of complementary data lines of a plurality of complementary data lines and VCC and GND connections are shown in FIG. 2 for simplicity. An enable line (or gate in the case of a transistor) of each of the switching devices S+ and S− is coupled to, for example, an unused general purpose I/O pin of the USB micro-controller 6. Accordingly, when the USB micro-controller 6 drives the I/O pin to an appropriate logic state, the D+ and D− data lines may be opened or shorted via switching devices S+ and S−. By disconnecting the D+ and D− data lines via switching devices S+ and S−, a physical removal of the USB device 10 may be simulated in order to allow the USB host to re-configure the USB device 10 during a brown out condition. In addition, the general purpose I/O pin of the USB micro-controller 6 is configured such that during and after a reset condition due to power up the data lines stay connected (e.g., the I/O pin enables switching devices S+ and S− during and after reset). Firmware in the USB micro-controller 6 keeps the data lines connected via switching devices S+ and S− during normal operation. However, when a brown out condition is detected, as will be described later, the USB micro-controller 6 opens the data lines via the switching devices S+ and S− for a duration greater than 2.5 micro-seconds and then reconnects them again. This procedure, for example, emulates the disconnect and re-connect procedure as specified in the USB specification v1.0, page 116.

Figure 3:
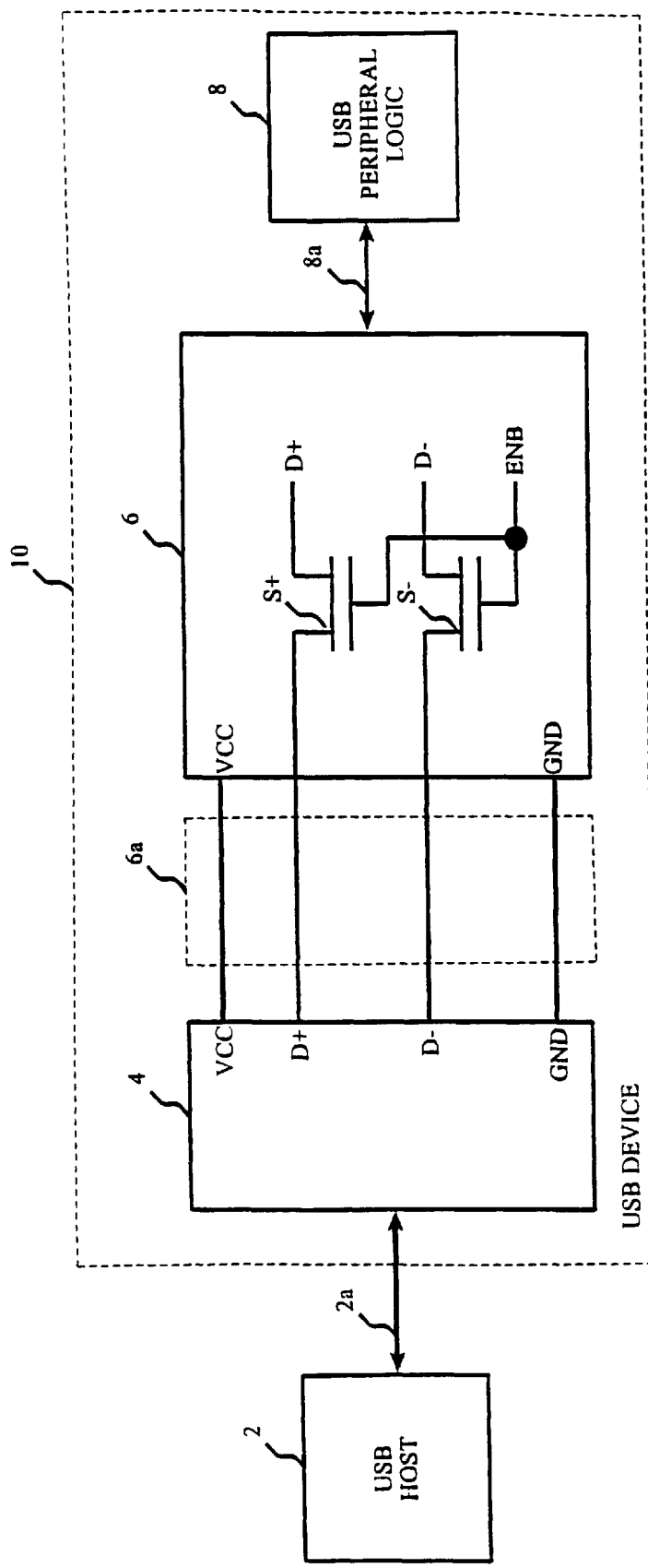
FIG. 3. is a block diagram illustrating a USB fail safe configuration in the system configuration of FIG. 1, according to a second embodiment of the present invention.

FIG. 3, is a second embodiment of the USB device 10 wherein the switching devices S+ and S−, of FIG. 2 are included within the USB micro-controller 6. In this way, use of the general purpose I/O pin of the USB micro-controller 6 is not required. The switching devices S+ and S− are coupled to positive (D+) and negative (D−) data lines of the signal lines 6a and an enable line (or gate in the case of a transistor) of each of the switching devices S+ and S− is enabled via an internal enable signal ENB of the USB micro-controller 6. The internal ENB signal may be implemented, for example, by using a bit from an internal register of internal logic (not shown) of the USB micro-controller 6 as an enable signal. Otherwise, the operation of the circuit of FIG. 3 is identical to the operation of the circuit of FIG. 2.

Figure 4:
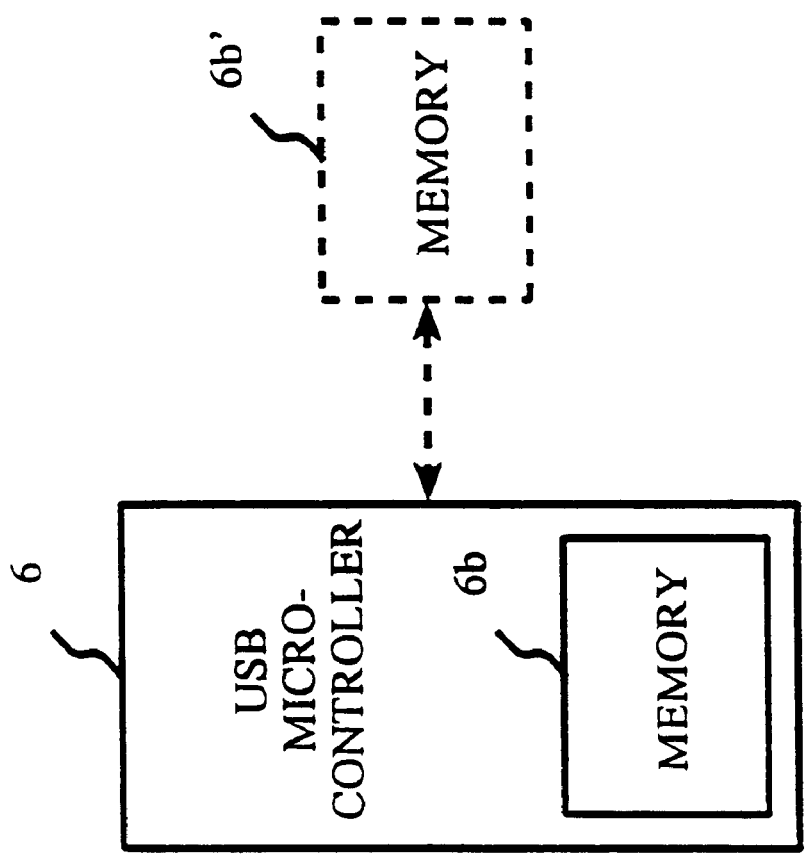
FIG. 4. is a block diagram illustrating details of a USB micro-controller of the system configuration of FIG. 1.

In FIG. 4, further details of the USB micro-controller 6 of FIGS. 1–3 are shown. The USB micro-controller 6 includes a memory 6b internal to the USB micro-controller 6, and/or a memory 6b' external to the USB micro-controller 6. The memory 6b is used for storing program information, variables, and/or for implementing firmware logic functions such as counters, state machines, etc. and may be implemented by means of a ROM, RAM, EEPROM, etc., or a combination of such memory devices.

Figure 5:
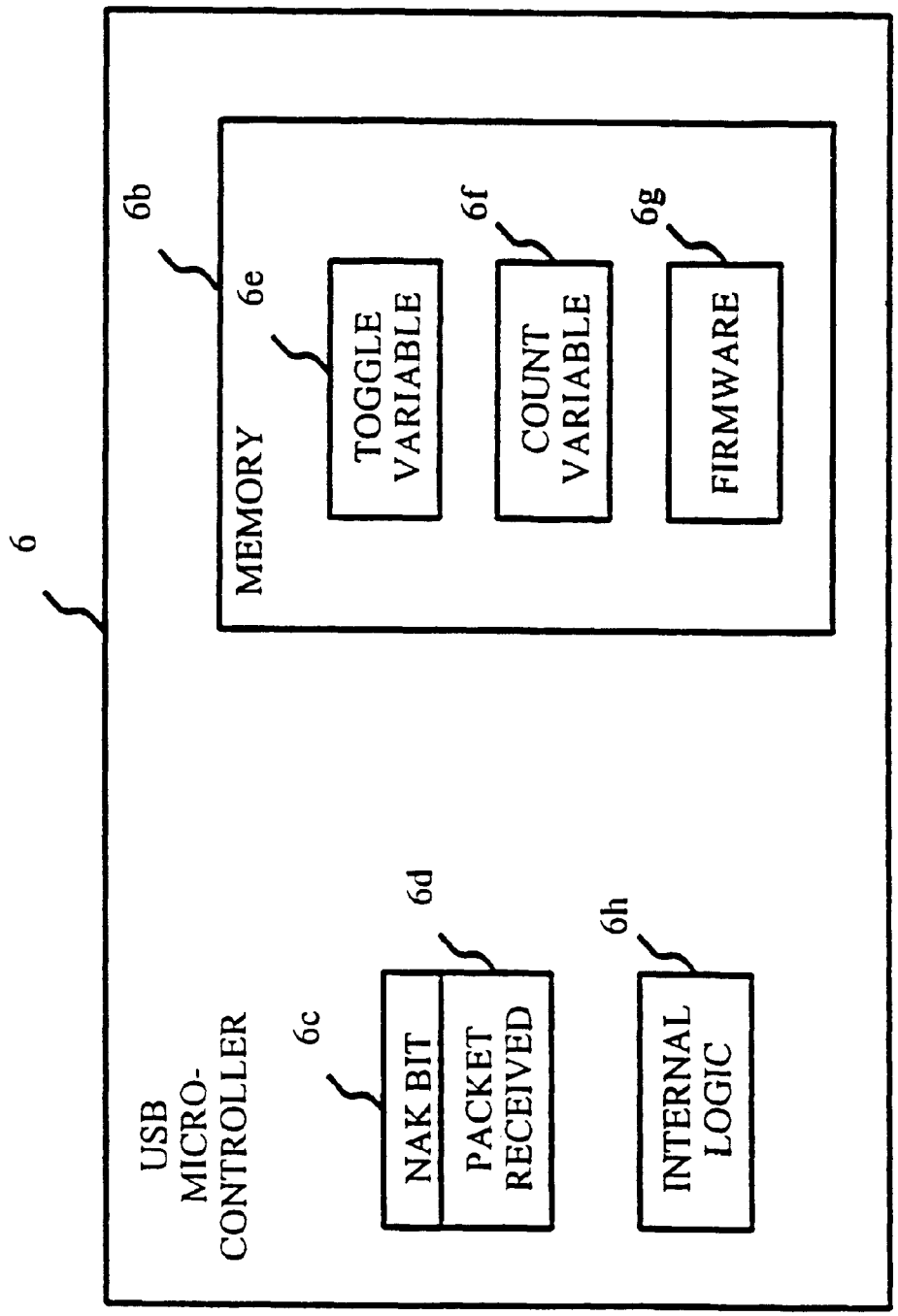
FIG. 5. is a block diagram illustrating details of a USB fail safe firmware and hardware configuration in the USB micro-controller of FIG. 4, according to the present invention.

In FIG. 5, further details of the USB micro-controller 6 of FIG. 4 are shown. The USB micro-controller 6 includes, for example, register 6c (e.g., NAK_to_Out bit in the USB control register of the CY7C6300) for storing a non-acknowledge (NAK) bit, register 6d (e.g., Out bit in the USB Endpoint 0 RX register of the CY7C6300) for storing a packet received bit, and internal logic 6h for performing other logic functions. The NAK bit is set by the internal logic 6h of the USB micro-controller 6 when the USB micro-controller 6 is busy and cannot receive a data packet from the USB host computer, and the packet received bit is set by the internal logic 6h of the USB micro-controller 6 when the USB micro-controller has successfully received a data packet from the USB host computer. The memory 6b includes, for example, memory locations for storing toggle variable 6e, count variable 6f, and firmware 6g. The toggle variable 6e, and the count variable 6f (e.g., implemented as a data structure in the memory 6b) are set and cleared by the firmware 6g running in the memory 6b. The firmware 6g will only clear the toggle variable 6e after the NAK bit 6c is cleared and the packet received bit 6d is set by, for example, the internal logic 6h of the USB micro-controller 6 (e.g., indicating that a packet has been received by the USB micro-controller 6). The count variable 6g is used to implement a counter function and is cleared and incremented by the firmware 6g.

Figure 6A:
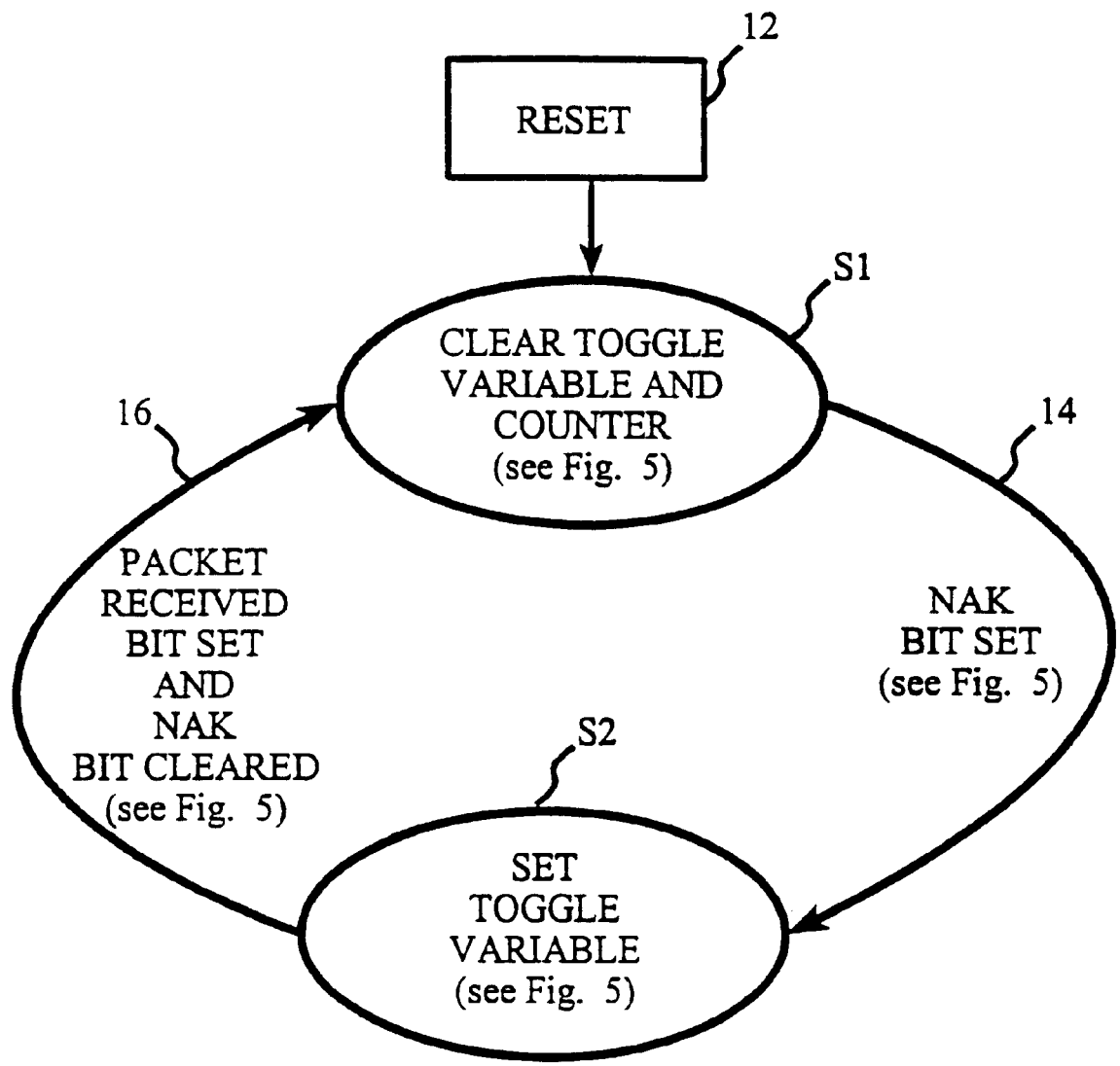
FIG. 6a. is a state diagram illustrating details of a USB fail safe configuration in the USB micro-controller of FIG. 5, according to the present invention.
Figure 6B:
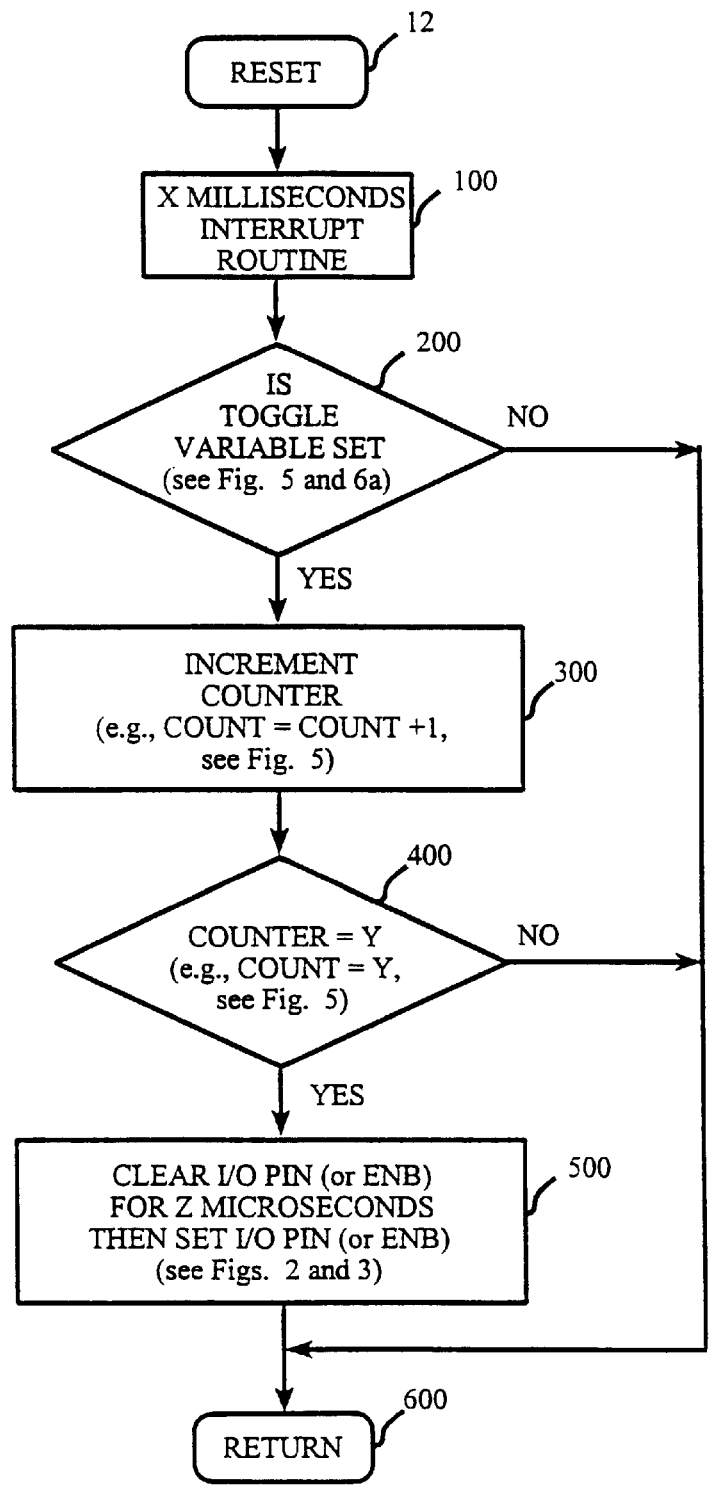
FIG. 6b. is a flow chart illustrating details of a USB fail safe configuration, according to the present invention.

FIGS. 6a and 6b are explained with reference to FIGS. 2, 3 and 5 to describe a method of detecting and recovering from a brown out condition according to the present invention. In the state diagram of FIG. 6a (e.g., implemented as a state machine running in memory 6b), after the USB micro-controller device 6 receives a reset signal at step 12 (e.g., due to power up, re-boot etc.), the logic flows to state Sl where the toggle variable 6e and the count variable 6f are cleared by the firmware 6g. When the NAK bit 6c is set by the internal logic 6h of the USB micro-controller 6 (e.g., during a busy condition indicating that no data packets can be received), at step 14 the logic flows to state S2 where the toggle variable 6e is set by the firmware 6g. When the internal logic 6h of the USB micro-controller 6 clears the NAK bit (e.g., because data packets can be received) and sets the packet received bit 6d (e.g., indicating that a data packet has been received) at step 16, the logic returns to state S1. In this way, the toggle variable 6e is, for example, used by the firmware 6g as an indicator of a busy condition (i.e., NAK bit is set) and for detecting and recovering from a brown out condition as will be explained with reference to the flow chart of FIG. 6b (e.g., implemented as firmware 6g in memory 6b).

In the flow chart of FIG. 6b, after the USB microcontroller 6 is reset, the logic flows to step 100 where an interrupt routine, for example which is executed every 1 millisecond, is initiated (i.e., X=1 millisecond) which perform steps 200 through 500. At step 200, it is determined whether the toggle variable 6e has been set (i.e., by the state machine of FIG. 6a). If the toggle variable 6e has been set (e.g, during a busy condition), then logic flows to step 300, and if the toggle variable 6e has not been set (e.g., during a non-busy condition), logic flows to step 600 where the interrupt routine is ended and a return to normal processing occurs until the next 1 millisecond interrupt routine is executed.

At step 300, the counter is incremented (e.g., the count variable 6f is incremented by one) and then at step 400 it is determined whether the counter is at a predetermined value Y of, for example, three (e.g., the count variable 6f is equal to three, Y=3). If the counter has reached the predetermined value, step 500 is performed, and if the counter has not reached the predetermined value, logic flows to step 600 where the interrupt routine is ended and a return to normal processing occurs until the next 1 millisecond interrupt routine is executed.

At step 500, it is determined that a brown out condition has occurred since the counter has reached the predetermined count (i.e, the USB micro-controller has been busy for 3 milliseconds) and (1) the I/O pin (or ENB line) is cleared, for example, for at least 2.5 microseconds (e.g., Z=2.5 microseconds), disconnecting the data lines of the USB micro-controller, then (2) the I/O pin is set, re-connecting the data lines of the USB micro-controller, and then logic flows to step 600 where the interrupt routine is ended and a return to normal processing occurs until the next 1 millisecond interrupt routine is executed. In this way, when brown out occurs (i.e., the USB micro-controller has been busy for 3 milliseconds), the data lines of the USB micro-controller 6 are opened via the switching devices S+ and S− for a duration greater than 2.5 micro-seconds and re-connected again. This procedure, for example, emulates the disconnect and re-connect procedure as specified in the USB specification v1.0, page 116, as previously discussed.

Although in the preferred embodiment the USB fail safe device is described in terms of a USB micro-controller and switching devices S+ and S−, this invention may be implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Although the preferred embodiment of the USB fail safe device is described in terms of a USB specification, the present invention could be adapted for other specifications such as Nubus, PCI, VESA, etc. by simply modifying the USB device 10 logic, as will be apparent to those skilled in the art.

Although the preferred embodiment of the USB fail safe device is described in terms of executing the interrupt routine every millisecond (i.e., X=1 at step 100 of FIG. 6b), detecting a brown condition when the USB micro-controller 6 is busy for 3 milliseconds (i.e., Y=3 at step 400 FIG. 6b), and disconnecting the data lines of the USB micro-controller 6 for 2.5 microseconds (i.e., Z=2.5 at step 500 of FIG. 6b), other values of X, Y and Z could be used to detect the brown condition, as will be apparent to those skilled in the art.

The present invention includes a computer program product (firmware 6g and the state machine of FIG. 6a) which may be on a storage medium including instructions which can be used to program memory 6 to perform a process of the invention. The storage medium can include, but is not limited to, any type of disk including floppy disks, optical discs, CD-ROMs, and magneto-optical disks, ROMs, RAMs, EPROMS, EEPROMS, magnetic or optical cards, or any type of media suitable for storing electronic instructions.

Obviously, numerous modifications and variations of each embodiment of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining and recovering from a processor busy condition, comprising the steps of:
   incrementing a counter if a variable indicative of the processor busy condition is set;
   determining if the counter has reached a predetermined count; and
   disconnecting at least one of a plurality of data lines of the processor from a bus coupled to the data lines for a predetermined amount of time if the counter has reached the predetermined count.

2. The method of claim 1, wherein the incrementing step further comprises:
   determining if the variable indicative of the processor busy condition is set.

3. The method of claim 1, wherein the disconnecting step comprises:
   disconnecting the at least one of a plurality of data lines for at least 2.5 microseconds.

4. A device for determining and recovering from a processor busy condition, comprising:

a first circuit configured to increment a counter if a variable indicative of a processor busy condition is set;

a second circuit configured to determine if the counter has reached a predetermined count; and a third circuit configured to disconnect at least one of a plurality of data lines of the processor from a bus coupled to the data lines for a predetermined time if the counter has reached the predetermined count.

5. The device of claim 4, wherein the predetermined time is at least 2.5 microseconds.

6. The method according to claim 1, further comprising the step of:

repeating the determining step and, if the counter has not reached the predetermined count again, reconnecting said disconnected data lines.

7. The method according to claim 4, wherein said device determines if said counter has reached the predetermined count again and, reconnects said disconnected data lines if said counter has not reached the predetermined count again.

8. The device of claim 4, wherein the processor comprises a universal serial bus (USB) micro-controller and the bus comprises a USB bus.

9. An apparatus for determining and recovering from a processor busy condition, comprising:

a memory coupled to the processor configured to store a variable indicative of whether or not the processor is in the busy condition;

a counter; and one or more devices configured to:
(a) increment the counter if the variable indicative of the processor busy condition is set,
(b) determine if the counter has reached a predetermined count, and
(c) disconnect at least one of a plurality of data lines of the processor from a bus coupled to the data lines for a predetermined amount of time if the counter has reached the predetermined count.

10. The apparatus of claim 9, wherein the one or more devices are further configured to determine if the variable indicative of the processor busy condition is set.

11. The apparatus of claim 9, wherein the predetermined time is at least 2.5 microseconds.

12. The apparatus of claim 9, further comprising:

a switch between each of the plurality of data lines and each corresponding data line of the bus, and wherein the switch is disconnected by the one or more devices.

13. The apparatus of claim 9, wherein the processor is a universal serial bus (USB) micro-controller and the bus is a USB bus.

14. The apparatus of claim 12, wherein the switch comprises a transistor having a gate coupled to a general purpose I/O pin of the processor configured to be controlled by the one or more devices.

15. The device of claim 12, wherein the switch comprises a transistor having a gate configured to be controlled by the one or more devices.

16. The device of claim 10, wherein any one of the counter, and the one or more devices are implemented via firmware running in the memory.

17. The device of claim 9, wherein the memory is internal or external to the processor.

18. The apparatus according to claim 9, further comprising determining if the counter has reached the predetermined count again and, if the counter has not reached the predetermined count again, reconnecting said disconnected data lines.

19. An electronically readable set of instructions executable by a processor, comprising:

determining whether the processor is in a busy condition;

incrementing a counter if the processor is in said busy condition;

determining whether the counter has reached a predetermined count; and disconnecting at least one of a plurality of data lines of the processor from a bus coupled to the data lines for a predetermined amount of time if the counter reaches the predetermined count.

20. The method according to claim 19, further comprising the step of:

repeating the determining step and, if the counter has not reached the predetermined count again, reconnecting said disconnected data lines.

* * * * *